J. W. GILBERT.
FEEDER FOR THRESHING MACHINES.
APPLICATION FILED OCT. 5, 1916.
1,215,645.
Patented Feb. 13, 1917.
5 SHEETS—SHEET 1.
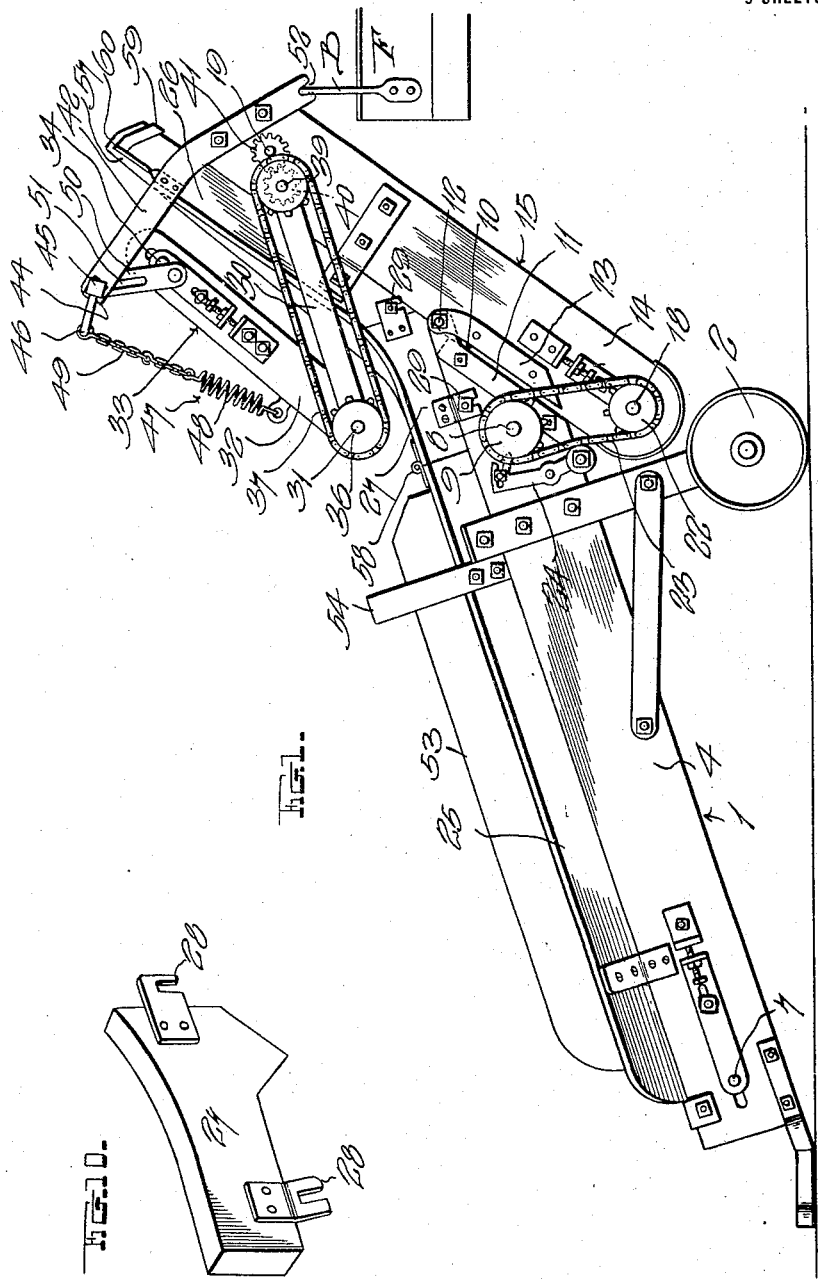
Witness
H. Woodard
Inventor
J. W. Gilbert
By H. B. Wilson & Co.
Attorneys

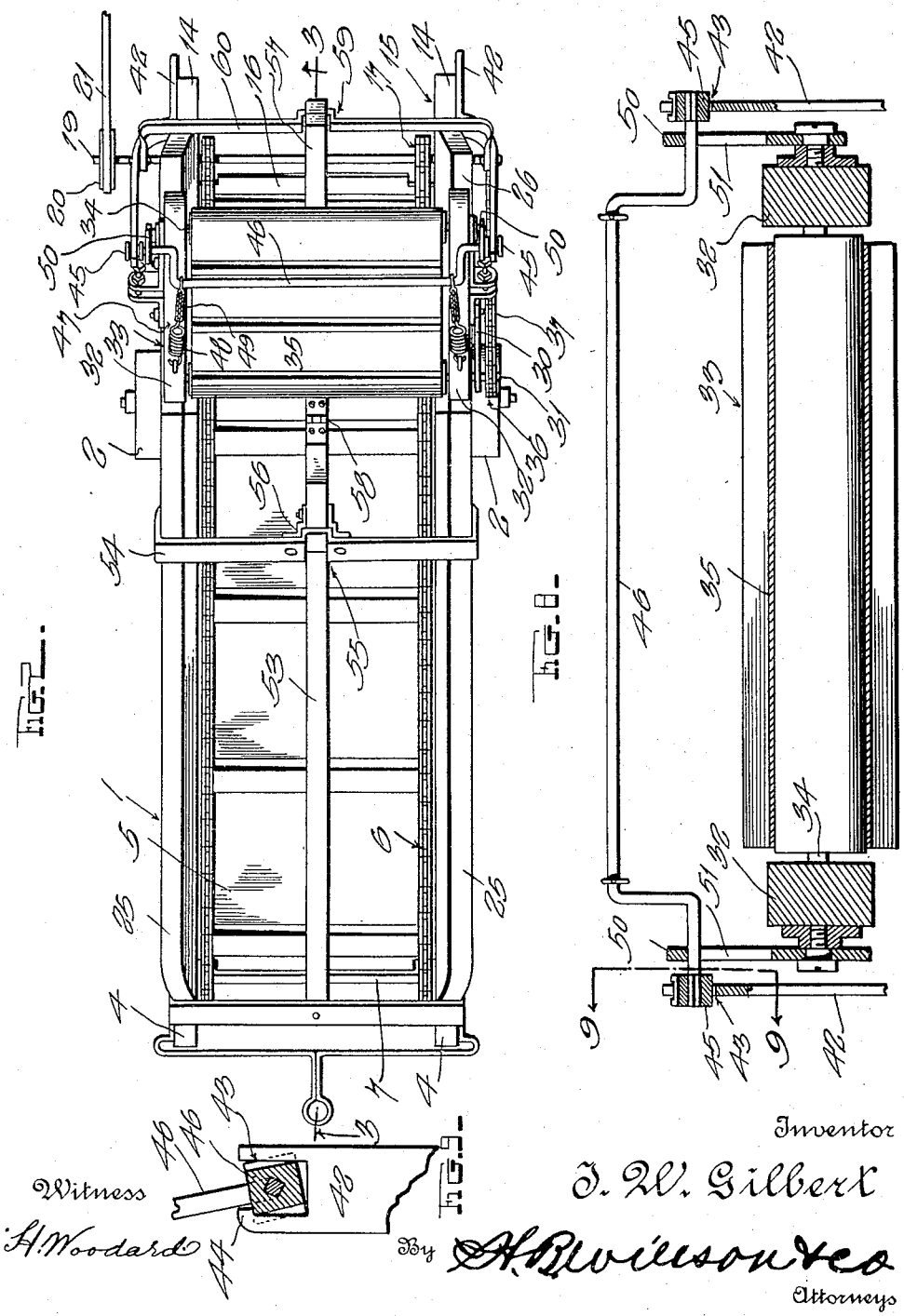

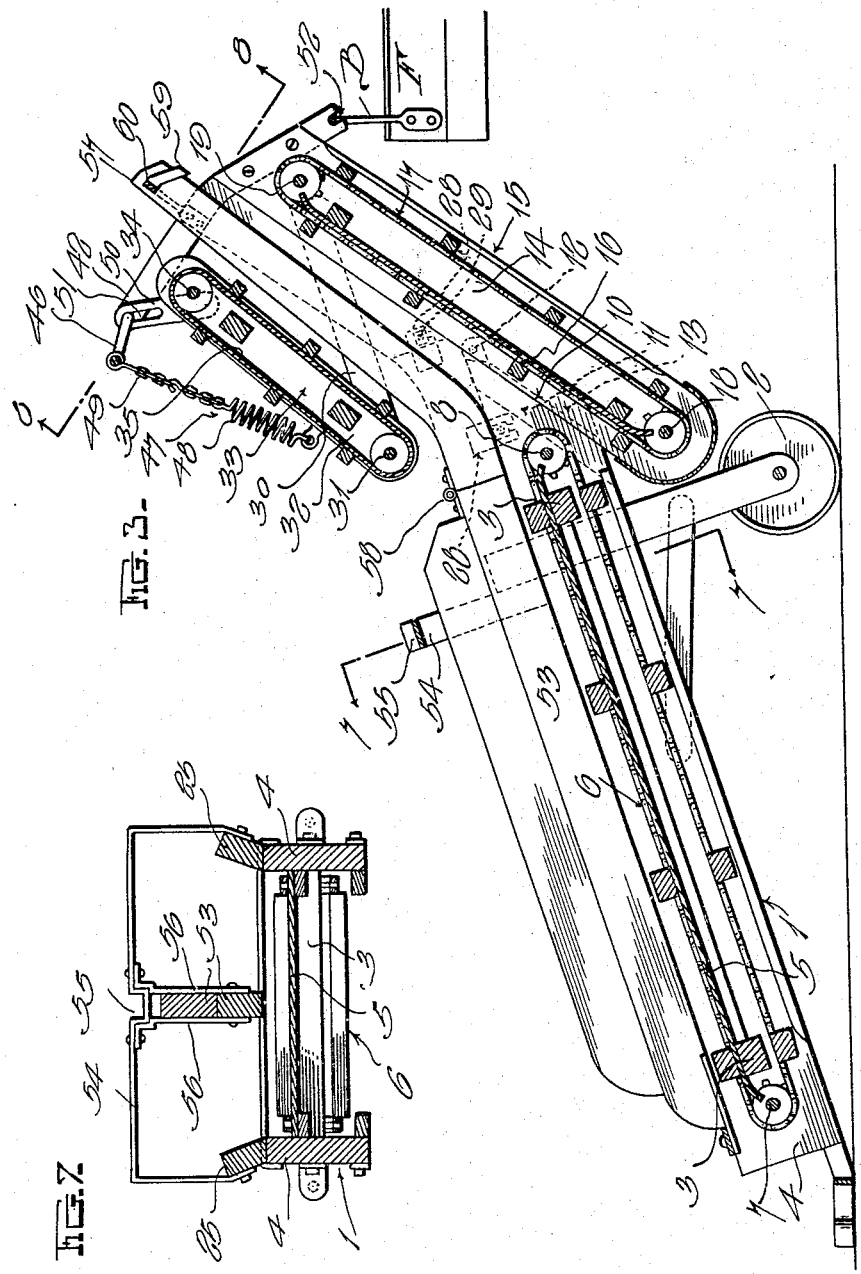

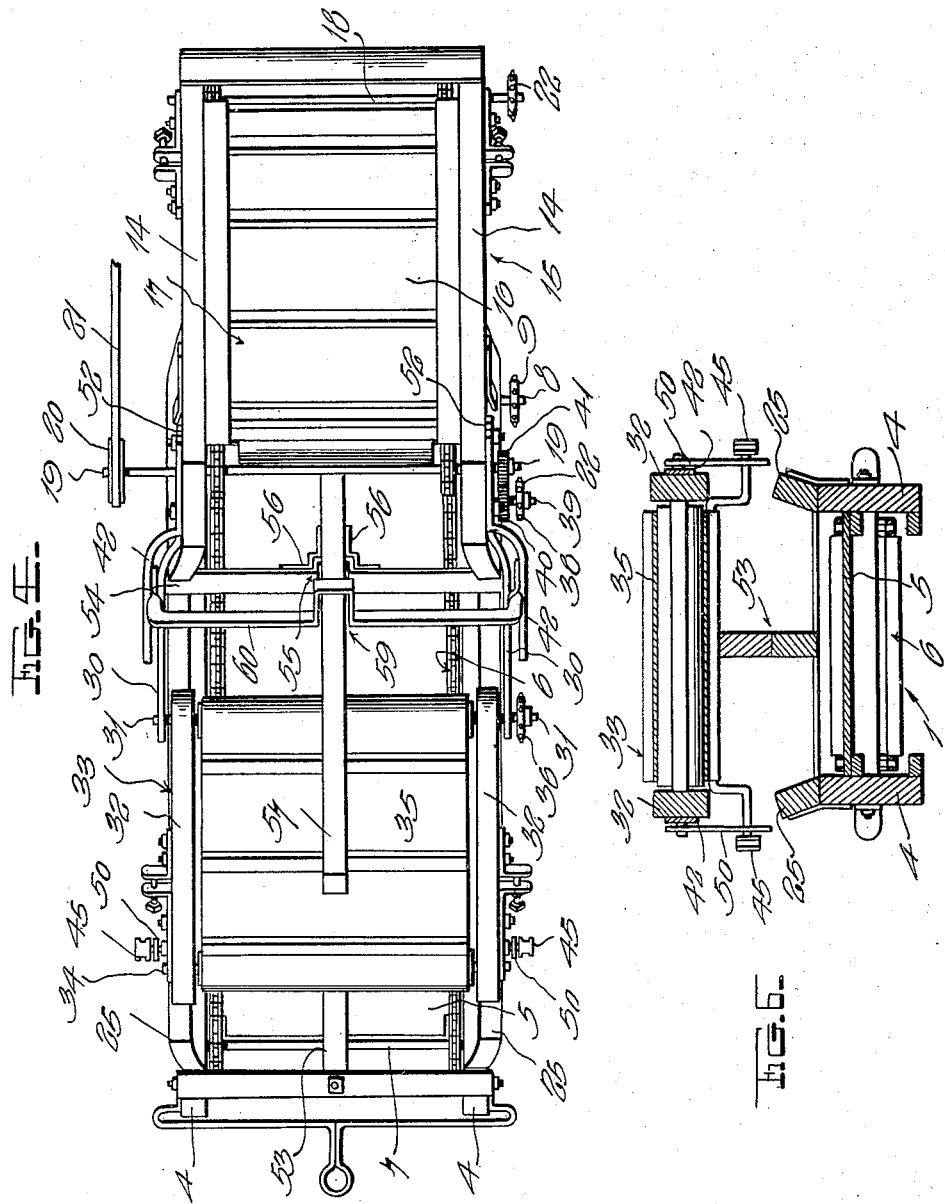

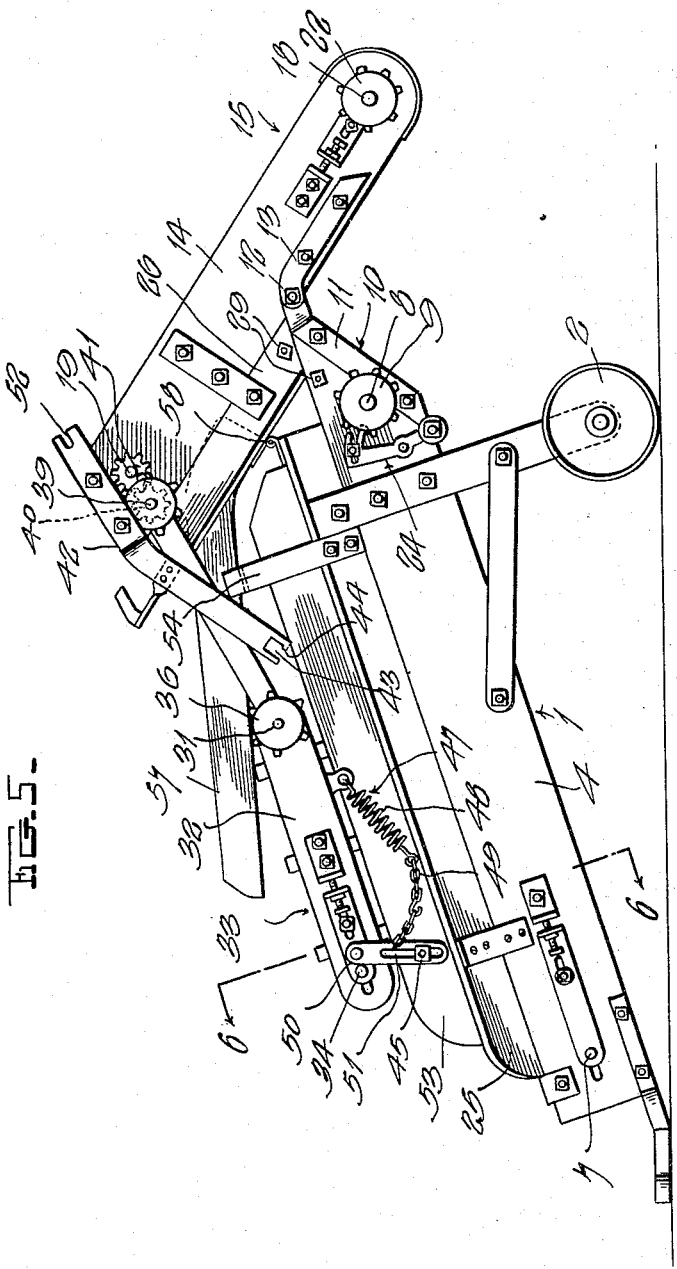

UNITED STATES PATENT OFFICE.

JESSE W. GILBERT, OF DELAVAN, KANSAS.

FEEDER FOR THRESHING-MACHINES.

1,215,645.

Specification of Letters Patent.

Patented Feb. 13, 1917.

Application filed October 5, 1916. Serial No. 123,933.

*To all whom it may concern:*

Be it known that I, JESSE W. GILBERT, a citizen of the United States, residing at Delavan, in the county of Morris and State of Kansas, have invented certain new and useful Improvements in Feeders for Threshing-Machines; and I do declare the following to be a full, clear, and exact description of the invention, such as will enable others skilled in the art to which it appertains to make and use the same.

My invention aims to provide a simple yet efficient machine for conveying unthreshed grain to the usual self-feeders of threshing machines without the necessity of lifting the grain the usual distance by hand.

A further object is to construct the device so as to readily fold to permit it to be drawn from place to place together with the threshing machine, by the traction engine used to operate both machines.

With the foregoing general objects in view, the invention resides in certain novel features of construction and in unique combinations of parts to be hereinafter fully described and claimed, the descriptive matter being supplemented by the accompanying drawings which constitute a part of this specification, and in which:

Figure 1 is a side elevation of a machine set up for operation;

Fig. 2 is a top plan view thereof;

Fig. 3 is a central longitudinal section on the plane indicated by the line 3—3 of Fig. 2;

Fig. 4 is a top plan view of the machine in folded position;

Fig. 5 is a side elevation with the parts located as shown in Fig. 4;

Fig. 6 is a vertical transverse section on the plane of the line 6—6 of Fig. 5;

Fig. 7 is a similar view on the plane indicated by the line 7—7 of Fig. 3;

Fig. 8 is a vertical transverse section taken substantially on the plane designated by the line 8—8 of Fig. 3;

Fig. 9 is a section of Fig. 8 on the plane of the line 9—9; and

Fig. 10 is a perspective view of one of the inserts which are employed between the side rails of the main and auxiliary conveyer frames.

Throughout the several views, the numeral 1 designates broadly a main conveyer frame inclined slightly and having its upper end supported on suitable wheels 2. Transverse bars 3 extend between the side bars 4 of the frame 1 and support a bottom 5 of sheet metal or other suitable material, an endless belt conveyer 6 being located in the aforesaid frame with its upper reach passing over the bottom 5. As shown, the conveyer 6 passes around sprockets on a lower shaft 7 and an upper shaft 8, one end of the last named shaft having thereon a sprocket 9 for a purpose to be described.

The upper ends of the side bars 4 are mitered as shown at 10 in a downward and inward direction, and hinge bars 11 are riveted or bolted to the outer sides of said bars along the mitered ends thereof, said bars 11 being pivoted or hinged at 12 to other hinge bars 13, the latter being secured to the side bars 14 of an auxiliary conveyer frame 15, the pivotal axes 12 being disposed intermediate the ends of the frame 15 so that the upper edges of the side bars 14 rest against the mitered ends 10 when the machine is in position for use.

The frame 15 is provided with a bottom 16 similar to the bottom 5 and an endless belt conveyer 17 passes around said bottom and over sprockets on a lower shaft 18 and an upper shaft 19 carried respectively by the upper and lower ends of frame 15. The shaft 19 is equipped on one end with a pulley 20 from which a belt 21 will lead to a suitable rotating pulley on the self-feeder which is designated broadly in the drawings by the letter F. The shaft 18 has thereon a sprocket 22 and a chain 23 is trained around this sprocket and the sprocket 9 on shaft 8, a suitable chain tightener 24 being provided as shown in Fig. 1. It will thus be evident that motion is transferred from the conveyer 17 to the conveyer 5 and that both of these conveyers travel in the same direction.

The main and auxiliary frames 1 and 15 respectively are provided on the upper edges of their side bars with guard rails 25 and 26, the inner ends of these rails being spaced apart to permit folding of the frame 15 onto the frame 1 as indicated in Figs. 4 and 5, in which position the inner ends of the rails 26 will rest on the upper edges of the side bars 4, the gaps between the rails 25 and 26 being normally filled by inserts 27 when the machine is in operation. Both inserts 27 are provided with forked ears 28 which engage headed studs 29 on the conveyer frames 1 and 15, and are thus held in operative position.

A pair of links 30 are pivoted at one end on the upper shaft 19 of the conveyer frame 15, the other ends of said links being similarly mounted on a lower shaft 31 which extends between the side bars 32 of an inclined presser frame 33 which is disposed above the auxiliary frame 15. Around a roller on the shaft 31 and a similar roller on a shaft 34 at the upper end of frame 33 is trained an endless belt 35 which serves to hold the unthreshed grain on the conveyer 17 so that the latter may carry such grain upwardly. A sprocket 36 is secured to one end of shaft 31 and is driven by means of a sprocket chain 37 which is trained around a sprocket wheel 38 mounted on a stub 39 projecting laterally from the upper end of one of the links 30. The sprocket 38 is equipped with a spur gear 40 meshing with a similar gear 41 which is keyed on one end of the shaft 19. The intermeshing gears 40 and 41 obviously cause the conveyer 35 to be driven reversely from 17, this being essential as will be understood. A pair of rigid bars 42 are secured to the upper ends of the side bars 14 and rise therefrom in the form of a pair of rigid arms, these arms having rectangular notches 43 in their upper ends as shown most clearly in Fig. 9, one wall of each notch having an overhanging nose 44 at its upper end. Blocks 45 on the ends of an arched transverse shaft 46 are received removably in the notches 43 and when said shaft is turned as illustrated clearly in Fig. 9, said blocks will underlie the noses 44 which latter will prevent them from being accidentally dislocated. For turning the shaft 46 to position the blocks 45 in the manner described, the yielding elements 47 are provided, said elements preferably consisting of coiled springs 48 secured to the side bars 32, and chains 49 connecting said springs with the arched portion of shaft 46.

A pair of links 50 are pivoted at their lower ends to the upper ends of the side bars 32 and are formed with vertical slots 51 through which the ends of the shaft 46 pass, this construction and the provision of the links 30 serving to permit vertical movement of the presser frame 33 as occasion may demand.

The lower ends of the bars 42 have notches 52 formed therein, these notched ends coöperating with suitable brackets B on the self-feeder F to retain the two machines in operative relation.

A dividing wall 53 extends along the longitudinal center of the frame 1 above the conveyer 6 and is constructed of one or more planks or boards as shown, an arched metal frame 54 being passed at its center over the upper end of said wall with its two legs secured to the side rails 25 of frame 1. The center of frame 54 is depressed at 55 for a purpose to appear, and metal straps 56 preferably depend from said frame and are secured to opposite sides of the wall 53 (see Fig. 7).

An auxiliary dividing board 57 is hinged at 58 to the upper end of the wall 53 as shown most clearly in Fig. 3, said auxiliary board extending above the conveyer 17 and having its upper end normally received in a seat formed by the depressed central portion 59 of a transverse bar 60 which is secured at its ends to the bars 42.

In use, the machine will be set up as shown in Figs. 1, 2, and 3, and when in this position, the unthreshed grain will be deposited upon the conveyer 6, the latter delivering such grain between the endless belts 17 and 35 which carry it upwardly and deposit it into the self-feeder F by which it is conveyed into the thresher in the usual manner.

When the machine is to be carried from one place to another, the shaft 46 is rocked against the tension of the springs 48, whereupon the blocks 45 may be removed from the notches 43 of the bars 42. This having been done, the entire presser frame 33 and parts carried thereby are folded over onto the frame 1 as depicted in Figs. 4 and 5, being supported for the most part on the upper edge of the dividing wall 53. Before the frame 33 can reach the position shown in the figures just referred to, it is necessary to remove the chain 23 and the inserts 27. The auxiliary frame 15 then may be swung over onto the frame 1 until the beveled inner ends of its side rails 26 contact with the upper sides of the side bars 4. This having been done, the dividing board 57 will assume the position shown in Fig. 5, and the entire machine will then be in rather compact form for drawing from one place to another.

The construction shown and described constitutes the preferred form of the feeder, but it is to be understood that within the scope of the invention as claimed, numerous changes may be made without sacrificing the principal advantages.

I claim:

1. In combination, a support, an inclined conveyer frame hinged to one end thereof to fold onto the same, an inclined presser frame above said conveyer frame, means pivotally connecting the lower end of the presser frame with the upper end of the conveyer frame, rigid arms rising from the upper end of said conveyer frame, a transverse shaft detachably connected at its ends with said arms, and slotted links connecting the upper end of the presser frame with said shaft.

2. In combination, a support, an inclined conveyer frame hinged to one end thereof to fold onto the same, an inclined presser frame above said conveyer frame, means pivotally connecting the lower end of the presser frame with the upper end of the conveyer frame, rigid arms rising from the upper end of said conveyer frame and having notches in their upper ends, a transverse shaft having blocks at its ends received in said notches, means for detachably holding said blocks in the notches, and means connecting the upper end of the presser frame with said shaft and serving to permit vertical movement of said presser frame.

3. In combination, a support, an inclined conveyer frame hinged to one end thereof to fold onto the same, an inclined presser frame above said conveyer frame, means pivotally connecting the lower end of the presser frame with the upper end of the conveyer frame, rigid arms rising from the upper end of said conveyer frame and having notches in their upper ends, one wall of said notches having an overhanging nose at its upper end, a transverse shaft having blocks at its ends for reception in the notches and beneath said noses when the shaft is turned a fraction of a revolution, means for so turning said shaft and holding it in such position, and means connecting the upper end of the presser frame with said shaft and serving to permit vertical movement of said presser frame.

4. In combination, a main conveyer frame having a dividing wall extending longitudinally thereof, an auxiliary conveyer frame hinged to one end of said main frame to fold thereon, an auxiliary dividing wall for said auxiliary frame hinged to the aforesaid dividing wall, and a transverse bar at the upper end of the auxiliary frame having a seat to loosely receive said auxiliary dividing wall when the latter is in operative position and to release said auxiliary wall when the auxiliary frame is folded onto the main frame.

5. In combination, a main conveyer frame having a dividing wall extending longitudinally thereof, an auxiliary conveyer frame hinged to one end of said main frame to fold thereon, an auxiliary dividing wall for said auxiliary frame hinged to the aforesaid dividing wall, and a transverse bar at the upper end of the auxiliary frame having its intermediate portion depressed to form a seat for loosely receiving the free end of said auxiliary dividing wall when the latter is in operative position.

In testimony whereof I have hereunto set my hand in the presence of two subscribing witnesses.

JESSE W. GILBERT.

Witnesses:
J. S. LANGLEY,
H. CARMINE.

Copies of this patent may be obtained for five cents each, by addressing the "Commissioner of Patents, Washington, D. C."